United States Patent Office 3,422,160
Patented Jan. 14, 1969

3,422,160
PROCESS FOR MANUFACTURING HALOMETHYL-
ATED ALKYL AROMATIC COMPOUNDS
Donald R. Napier, Ponca City, Okla., assignor to Continental Oil Company, Ponca City, Okla., a corporation of Delaware
No Drawing. Continuation-in-part of application Ser. No. 430,747, Feb. 5, 1965, now Patent No. 3,288,555. This application Oct. 18, 1965, Ser. No. 497,536
U.S. Cl. 260—651      9 Claims
Int. Cl. C07c 17/00; C07c 25/14

ABSTRACT OF THE DISCLOSURE

Polychloromethylated alkaryl hydrocarbons are prepared by reacting one mole of an alkaryl hydrocarbon with about 2.6 to about 6 moles of sulfuric acid and from about 2.1 to about 4 moles of a methyl halomethyl ether in which the halogen atoms are selected from the group consisting of chlorine and bromine.

---

This application is a continuation-in-part of application Ser. No. 430,747 filed Feb. 5, 1965, now Patent No. 3,288,555. The present invention relates to a method of preparing halomethylated alkyl aromatic compounds, and specifically, compounds, and mixtures of compounds, of this genus which have utility as intermediates in the preparation of certain surface active quaternary ammonium compounds highly useful as corrosion inhibitors.

In copending application Ser. No. 430,747, certain quaternary ammonium compounds unusually effective as corrosion inhibiting materials are disclosed. The process of producing these useful quaternary ammonium compounds is also described, and generally comprises initially preparing a halomethylating agent as hereinafter described, reacting such halomethylating agent with an alkyl aromatic compound to form polyhalomethylated, surface active, alkyl aromatic compounds, then reacting the latter compounds with a heterocyclic nitrogen-containing compound to yield the desired, corrosion inhibiting quaternary ammonium compounds.

As indicated in the cited copending application, one of the novel and important aspects of the process of preparing the quaternary ammonia compounds is the procedure employed in the preparation of the polyhalomethylated alkyl aromatic intermediates. The reaction conditions employed in preparing the intermediates results in the halomethylation of the alkaryl hydrocarbon used in the reaction so that the average number of halomethyl groups present in the molecules of the product mixture of polyhalomethylated alkyl aromatic compounds is from about 1.1 to about 3.

The present application treats in greater detail the process of preparing the polyhalomethylated alkyl aromatic intermediate compounds. It is thus an important object of this invention to provide a method of preparing polyhalomethylated alkyl aromatic compounds, and specifically, mixtures of such compounds in which the average number of halomethyl groups present in the several compounds of this type in the mixture is from about 1.1 to about 3.

Another object of the invention is to provide a process for manufacturing polyhalomethylated alkyl aromatic compounds having particular utility as intermediates in the preparation of quaternary ammonium compounds functioning especially effectively as corrosion inhibitors and as bactericides.

A more specific object of the invention is to provide a process which can be utilized to prepare bis-halomethylated derivatives of higher alkaryl hydrocarbons to the predominant exclusion of monohalomethylated derivatives of such hydrocarbons.

An additional object of the invention is to provide a halomethylation process which can be utilized in the preparation of polyhalomethyl alkyl aromatic compounds in a relatively high concentration, and containing a minimal amount of undesirable condensation products, such as diaryl methanes.

In addition to the foregoing described objects and advantages, additional objects will become apparent from the following detailed description of the invention.

In United States Patent 2,846,480 to Gifford C. McClaflin and Edsel L. Miller, a process is disclosed for chloromethylating alkyl benzenes. Under the described process conditions, the chloromethylated alkyl aromatic compounds produced by the process are predominantly monochloromethylated compounds. I have now determined that, by alteration of the process conditions, and particularly, by alteration of the mole ratio of reactants employed in a halomethylation process, the degree of halomethylation achieved in the product compounds can be desirably varied so as to produce halomethylated alkyl aromatic compounds which are characterized in having improved properties for certain uses hereinafter described. More specifically, by the alteration of process conditions from those described in the McClaflin et al. patent, a mixture of halomethylated alkaryl compounds can be produced in which the average number of halomethyl groups included in the several species of compounds present in the resulting mixture is between about 1.1 and about 3 groups.

By further and closer control of the process conditions, and proper selection of the starting materials, the bis-halomethylated derivatives may be made to predominate in the product mixture. The derivatives have been found to yield superior corrosion inhibiting and bactericidal quaternary ammonia compositions when utilized as an intermediate in the production of such corrosion inhibiting compositions. When polyhalomethylated alkyl aromatic compounds containing from 1.1 to 3 halomethyl groups are used, an improvement also results in the corrosion inhibiting effectiveness of quaternary ammonium compounds produced therefrom as compared to the monohalomethylated alkyl aromatic compounds prepared in accordance with processes disclosed in the prior art.

The process of the invention broadly comprises halomethylating an alkyl aromatic compound with from about 2.1 to about 4 moles of halomethylating agent per mole of the alkyl aromatic compound under conditions of time and temperature hereinafter described.

A suitable aromatic compound which can be halomethyl and then reacted with nitrogen compounds to form particularly desirable quaternary ammonium corrosion inhibiting agents has the following formula:

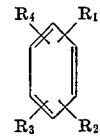

wherein $R_1$ is a normal or branched chain aliphatic radical containing from about 8 to about 22 carbon atoms, preferably from about 9 to about 15 carbon atoms, and $R_2$, $R_3$ and $R_4$ are either hydrogen, methyl, or ethyl.

Similarly, substituted polynuclear aromatic hydrocarbons are also suitable, but to a lesser degree than the material described above. These materials have the formula:

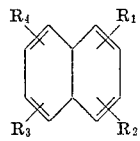

wherein $R_1$, $R_2$, $R_3$ and $R_4$ are as defined above.

It is to be understood that mixtures of the above listed materials can be used to prepare the polyhalomethylated alkyl aromatic compounds in accordance with the invention. In fact, the commercially available alkyl aromatic hydrocarbons for use in the invention usually are mixtures of these materials.

Specific examples of alkaryl hydrocarbons which can be subjected, individually or in admixture, to halomethylation in the process of the invention are given below. The symbol "br" indicates that the alkyl substituent is branched.

| | |
|---|---|
| n-octylbenzene | br-octyltoluene |
| br-octylbenzene | n-octylxylene |
| n-nonylbenzene | br-nonylxylene |
| br-nonylbenzene | n-octylnaphthalene |
| n-octyltoluene | n-tetradecylbenzene |
| br-decyltoluene | br-pentadecyltoluene |
| n-dodecylbenzene | n-heptadecylxylene |
| br-dodecylbenzene | n-nonadecyltoluene |
| n-hexadecyltoluene | n-eicosyltoluene |
| br-octadecylbenzene | br-docosylbenzene |

An example of a particularly suitable commercially available alkyl aromatic hydrocarbon which can be used in the process of the invention is a material which is known to the trade as dodecylbenzene. Dodecylbenzene is available under the trade name of "Neolene" 400 from Continental Oil Company. In a typical process, dodecylbenzene is prepared by first polymerizing propylene to produce a mixture of olefins which are predominantly $C_{12}$ (dodecene). The dodecene is then alkylated with benzene to produce dodecylbenzene. The preparation of dodecylbenzene is described more completely in U.S. Patent 2,941,015 to Robert R. Kylander, which patent is made a part of this specification. A typical sample of dodecylbenzene has the following properties:

Distillation range, ° F.:
```
    I.B.P. _____ 535.
    5%   _____ 545.
    10%  _____ 550.
    50%  _____ 560.
    90%  _____ 580.
    97%  _____ 592.
    F.B.P. _____ 603.
Percent recovery _____ 99.
Specific gravity, 60° F. _____ 0.875.
Molecular weight[1] _____ 237.
Aniline point[2] _____ 48.5.
Bromine No.[3] _____ 0.12.
Saybolt color[4] _____ 29.
Refractive index, 25° C. _____ 1.4885.
Appearance _____ Clear and
                                water white.
Flash point (closed cup), ° F.[5] _____ 260.
Viscosity, centipoises at—
    68° F. _____ 14.
    32° F. _____ 37.
```

[1] Cryoscopic method using benzene.
[2] ASTM D-611.
[3] ASTM D-1159.
[4] ASTM D-156.
[5] ASTM D-56.

It is generally known that the alkyl group in dodecylbenzene is branched chain. More recently, in order to produce detergents which are less resistant to attack by bacteria, straight chain alkyl aromatic hydrocarbons, similar to dodecylbenzene, have been prepared. These materials constitute a class of materials which, when sulfonated, are known in industry as biodegradable detergents. It is to be understood that any of the n-alkyl aromatic hydrocarbons which are used in preparing biodegradable detergents can be used in the process of the present invention.

The preparation of a particularly suitable n-alkyl aromatic hydrocarbon for use in this invention is described in application Ser. No. 129,252, filed Aug. 4, 1961, and now abandoned, and having the same assignee as the present application. For reason of convenience, this application is made a part of the present application. Briefly, application Ser. No. 129,252 relates to a process of preparing a detergent alkylate wherein the process comprises the following steps, broadly stated: (a) separating a fraction of substantially straight chain $C_8$–$C_{18}$ hydrocarbons from a petroleum distillate substantially free of olefins and containing said straight chain hydrocarbons together with non-straight chain hydrocarbons, (b) chlorinating said fraction to the extent whereby between about 10 and about 35 mole percent of the straight chain hydrocarbons present are substantially only mono-chlorinated, (c) alkylating an aromatic compound, selected from the group consisting of benzene, a lower alkyl substituted benzene and mixtures thereof, with the chlorination product of step (b) in the presence of an alkylation catalyst.

n-Alkyl aromatic hydrocarbons of the aforementioned type are available under the trademarks "Nalkylene" 500 and "Nalkylene" 600 from Continental Oil Company. These materials have the following typical properties:

"Nalkylene" 500

| Test | Typical Value | Test Method |
|---|---|---|
| Boiling range (° F.) | 535–595 | ASTM D–447. |
| Bromine No. | 0.05 max | ASTM D–1158. |
| Average molecular weight | 231–241 | Mass spec. |
| Color, Saybolt | +25 | |
| Specific Gravity (20/20) | 0.85–0.87 | ASTM D–287. |
| Viscosity (Saybolt seconds) | 40–45 at 100° F | ASTM 88–44. |

"Nalkylene" 600

| Test | Typical Value | Test Method |
|---|---|---|
| Boiling range (° F.) | | ASTM D–447. |
| 5% | 580–590 | |
| 95% | 600–615 | |
| Bromine No. | 0.05 max | P.M. #21. |
| Average molecular weight | 255–264 | Mass spec. |
| Color, Saybolt | 25 min | P.M. #20. |
| Specific gravity | 0.85–0.87 | ASTM D–287. |
| Viscosity (Saybolt seconds) | 40–46 at 100° F | ASTM 88–44. |

The alkyl aromatic hydrocarbon can be subjected to varying degrees of halomethylation. In fact, usually the halomethylation products are mixtures of compounds containing 1, 2 or 3 halomethyl groups. Moreover, the distribution of these products varies according to the type of alkyl aromatic hydrocarbon employed. Thus, while the above-identified "Neolene" 400 and "Nalkylene" 500 exhibit approximately equal reactivity in a dihalomethylation process, the product of the former is essentially all bis derivative, whereas the product of the latter is more nearly a mixture of mono and tris derivatives.

The degree of halomethylation is the average of the number of halomethyl groups present. For convenience in describing the halomethylation products, we have adopted the following terminology: the term "mono" refers to those materials having an average of from about 1 to less than about 1.1 halomethyl groups per molecule; the term "poly" refers to those materials having from about 1.1 to about 3 halomethyl groups per molecule. Included within, or encompassed by, the defined "polyhalomethylated materials," the term "bis" refers to those materials having above 1.5 and less than 2.5 halomethyl groups. Since, in certain instances, the "bis" halomethylated derivatives provide superior results, the inhibitors derived from this material are most preferred. It is, of course, also within the scope of this invention to produce the "poly" derivatives, which, though less desirable as intermediates in the production of quaternary ammonium compounds than the more precisely defined "bis" derivatives, are superior to the "mono" derivatives.

The term "halomethylation" as used herein refers only to either chloromethylation or bromomethylation. The employment of chloromethylation is preferred.

In the process of the invention, a particular halomethylating agent, methyl halomethyl ether, is utilized which is preferably formed by reacting at a temperature of from about −20° C. to about 60° C., formaldehyde or a compound which engenders formaldehyde with a chlorine- or bromine-containing compound which will engender hydrogen chloride or hydrogen bromide in the presence of an alcohol and sulfuric acid. The methyl halomethyl ether can be derived from any suitable source, however, and is reacted with the selected alkyl aromatic compound in the prsence of a sulfuric acid catalyst as hereinafter described.

Suitable chlorine- and bromine-containing compounds which will engender hydrogen chloride under the conditions preferably used herein include phosphorus trichloride, phosphorus tribromide, phosphorus pentachloride, phosphorus pentabromide, sulfuric oxychloride, sulfuric oxybromide, sulfurous oxychloride, acyl chlorides such as acetyl chloride. The use of chloromethylating agents in the reaction is preferred to the employment of bromine-containing compounds.

Suitable alcohols are the primary monatomic saturated aliphatic alcohols containing from 1 to 4 carbon atoms, such as, for example, the alkanols, methanol, ethanol, normal propanol and normal butanol.

The relative amounts of the various components of the preferred chloromethylating reagent, and the amount of chloromethylating agent used in relation to the alkaryl hydrocarbon, are shown below.

|  | Suitable (moles) | Preferred (moles) |
| --- | --- | --- |
| Alkaryl hydrocarbon | 1 | 1 |
| Formaldehyde | 2.1–4.0 | 3.4–3.6 |
| Alcohol | 2.1–4.0 | 3.1–3.3 |
| Chlorine-containing compound | 1.0–3.0 | 1.1–1.3 |
| Sulfuric acid | 2.6–6.0 | 4.0–5.0 |

The halomethylation reaction is conducted at a temperature in the range of about 50° C. to about 100° C., preferably from about 65° C. to about 70° C., and more preferably, about 66° C. to about 68° C. The reaction is conducted for a time in the range of from about 0.5 to about 20 hours, preferably from about 4 to about 6 hours.

Specifically, the chloromethylation procedure can be illustrated as follows: 100 grams of dodecylbenzene is treated with a chloromethylating mixture which has been prepared as follows: 42 grams of p-formaldehyde and 43 grams methyl alcohol are added to a 1-liter Morton flask which is equipped with a sealed stirrer, thermometer, and dropping funnel. The flask is placed in an ice bath and mixing is begun. Phosphorus trichloride (65.5 grams) is added dropwise from the funnel while maintaining a temperature between 29 and 32° C. After the chloride addition, the reaction mass is aged 10 minutes at the same temperature. One hundred seventy-five grams of 100 percent sulfuric acid is then added to the dropping funnel. The sulfuric acid is then added to the reaction mass at a rate to maintain the same temperature. This is followed by post-stirring for an additional 15 minutes. This reaction mass and the dodecylbenzene are combined and heated at 67° C. for 5 hours to produce the chloromethylated dodecylbenzene.

It is of interest that using a normal alkylbenzene as the starting material, and using the preferred conditions described above, a product results which contains similar amounts of mono and tris chloromethylated alkylbenzenes. By contrast, under the same conditions, using a branched alkylbenzene (e.g., commercial dodecylbenzene) results in a product containing mostly bis chloromethylated alkylbenzenes.

In order to disclose the nature of the present invention still more clearly, the following illustrative examples will be given. It is to be understood, however, that the invention is not to be limited to the specific conditions or details set forth in these examples except insofar as such limitations are specified in the appended claims. Parts given are parts by weight.

EXAMPLE I

This example illustrates the preparation of a typical halomethylated alkaryl composition using the process of the invention, and the use of this composition in preparing a quaternary ammonium corrosion inhibitor.

(A) Preparation of 3,4-bis(chloromethyl)dodecylbenzene.—A 2-liter Morton flask equipped with stirrer, thermometer, reflux condenser and addition funnel was charged with formaldehyde (168 parts) and methanol (172 parts). With cooling applied to the flask, phosphorous trichloride (262 parts) was added dropwise in 20 minutes, the temperature being maintained at 26° to 31° C. The mixture was post-stirred 15 minutes, then 100 percent sulfuric acid (700 parts) was added in 25 minutes, while maintaining the same temperature. After post-stirring the chloromethylating mixture for 22 minutes, DBCl (primarily 4-chloromethyl dodecylbenzene, 480 parts) was charged to the flask and the resulting mass was stirred and heated at 75° C. for 3 hours.

The mass was allowed to settle overnight. The upper (organic) layer was separated and then recycled to a second chloromethylation treatment identical to the first. Analyses indicated that the final product contained approximately 80 mole percent of the 3,4-bis chloromethyl derivative. After washing with hot water, followed by hot 2 percent sodium carbonate, and filtering through Hy-Flo filter aid, the product was subjected to fractional distillation. A viscous, colorless fraction containing 19.9 weight percent benzyl-type chlorine and some 90.6 mole percent of the 3,4-bis derivative was isolated.

(B) Preparation of the pyridinium derivative of a bis chloromethylated dodecylbenzene having good corrosion inhibiting properties.—The 91 percent bis chloro compound (2.0 parts) described above, pyridine (0.975 part—10 percent stoichiometric excess) and isopropanol (2.8 parts) were stirred and heated at reflux for 2 hours. The product was a homogeneous liquid containing 100(±2) percent of the theoretical amount of chloride ion. It dissolved in water to give a soapy, oil-free, light amber-colored solution.

Corrosion test conditions

Corrosion testing of the pyridinium derivative was conducted in controlled temperature baths maintained at 140° F. and 180° F. Steel coupons were cut from ⅛ inch thick sheets of steel. The steel used in the test was S.A.E. 1020 mild steel, 302 stainless steel, and a low-chromium alloy steel (~2% Cr). (Unless otherwise noted, the steel employed was S.A.E. 1020 mild steel.) The steel coupons were surface ground, cleaned in acetone to remove grease and solvents, and weighed. Bottles of approximately 300 ml. capacity were filled with test solution (10 percent HCl, or 5 percent $H_2SO_4$ plus 0.5 percent NaCl) and brought to temperature. The inhibitors were then added to the desired concentration and the coupon was immersed.

Corrosion rates were obtained both by measuring the hydrogen evolved by the corrosion reaction and by weighing the coupon after specified time intervals. Rates were determined in both inches penetration per year (ipy) and pounds of steel dissolved per 1000 square feet per hour. In comparative tests of quaternary ammonium derivatives of chloromethylated branched-chain dodecylbenzene derivatives prepared by the process of this invention and commercially available corrosion inhibiting compositions now in use, the quaternary ammonium compounds derived from the chloromethylated intermediates were clearly superior in their corrosion inhibiting properties.

EXAMPLE II

A creased 12-liter, three-necked flask equipped with mechanical stirrer, thermometer and double length reflux condenser (maintained at 0 to 5° by cold circulating kerosene) was charged with 1,050 grams of paraformaldehyde and 1,075 grams of methanol. While cooling the flask, 1,640 grams of phosphorous trichloride were added dropwise to the flask over a period of about 25 minutes while maintaining the temperature between 26° and 31° C. The mixture was post-stirred for about 12 minutes and then 4,380 grams of 100 percent sulfuric acid were added at a relatively slow rate permitting the flask to be maintained at a constant temperature. After post-stirring the mixture for about 20 minutes, 2,500 grams of "Nalkylene" 500 (as hereinbefore defined) were charged to the flask, and the mixture was stirred for a period of 5 hours while maintaining the contents of the flask at a temperature of 67–68° C. The contents of the flask were then permitted to settle.

The acid sludge was siphoned off of the reaction mixture and 2 liters of 200° F. water were added to the flask with as little mixing as possible. After about 15 minutes, the water was siphoned out and then a second charge of 3.5 liters of water at a temperature of 200° F. was added. The mixture was stirred gently and heated for 20 minutes. Rapid and clean separation of the organic and inorganic phases occurred as soon as stirring was stopped. A third wash was made using 3.5 liters of a 1.0 weight percent aqueous solution of sodium carbonate at a temperature of 200° F. in which the mixture was heated and gently stirred 30 minutes and then allowed to settle for 1 hour. About 100 grams of emulsified product were lost in the separation of the carbonate wash. The residual product weighed 3,100 grams after drying in vacuum at 25° F., and constituted a 94.5 percent yield. Analysis of the product indicated that the product contained 17.1 weight percent benzyl-type chlorine, and contained an average of 1.56 chloromethyl groups per mole.

EXAMPLE III

This example illustrates the chloromethylation of various alkaryl hydrocarbons, and monomethyl derivatives of various alkaryl hydrocarbons, employing the chloromethylating agent hereinbefore described. The conditions of time and temperature are described in Table I below, wherein the results of this example are shown.

TABLE I

| Run No. | Alkaryl Hydrocarbon or Derivative | Quantity of chloromethylating reagent (Units [1] per mole of hydrocarbon) | Temp. (° C.) | Reaction Time (hrs.) | n [2] | Percent Conv. to Bis |
|---|---|---|---|---|---|---|
| 1 | "Neolene" 400 [4] | 2 | 67–70 | 5 | 1.51 | 51 |
| 2 | Dodecylbenzyl chloride [5] | 2 | 65 | 10 | 1.65 | 65 |
| 3 | do [5] | 1 | 75 | 5 | 1.42 | 42 |
| 4 | do [5] | 2 | 75 | 10 | ([3]) | |
| 5 | do [5] | 2 | 55 | 3 | 1.34 | 34 |
| 6 | do [5] | 2 | 80 | 3 | 1.47 | 47 |
| 1 | "Neolene" 400 [4] | 2 | 55 | 3 | 1.20 | 20 |
| 7 | do [4] | 2 | 80 | 3 | 1.39 | 39 |
| 8 | "Nalkylene" 500 [6] | 2 | 67–70 | 5 | 1.53 | 53 |
| 90 | Product of Run 5 (Recycled) | 2 | 67–70 | 5 | 1.95 | 95 |
| 11 | "Nalkylene" 600 [6] | 2 | 67–70 | 5 | 1.32 | 32 |

[1] A unit of reagent contained the following: 1.75 moles, formaldehyde; 1.63 moles, methanol; 0.60 mole, PCl₃; 2.25 moles, sulfuric acid, the reagent being prepared as described in Examples I and II.
[2] n refers to the degree of chloromethylation of the alkaryl hydrocarbon, as defined previously.
[3] No product could be isolated due to failure of reaction mixture to split into two phases.
[4] "Neolene" 400 refers to a branched-chain dodecylbenzene, described previously.
[5] Derived from "Neolene" 400.
[6] "Nalkylene" 500 and "Nalkylene" 600 refer to n-alkylbenzene, described previously.

EXAMPLE IV

As previously indicated, the mole percent conversion of the alkyl aromatic hydrocarbon to the bis chloromethylated derivative increases, though at a diminishing rate, as the product from a chloromethylation treatment is recycled and subjected to one or more repeated chloromethylation treatments. This example illustrates the effect of such recycling and repeated chloromethylation treatments. The conditions of time and temperature, and the results obtained, are set forth in Table II below.

TABLE II

| Run | Alkaryl Hydrocarbon Starting Material | Quantity of Chloromethylating Reagent (Units per mole of hydrocarbon) | Temp. (° C.) | Reaction Time (hrs.) | Mole Percent Converted to Bis |
|---|---|---|---|---|---|
| 1 | Dodecylbenzyl chloride | 1 | 65 | 3 | 30 |
| 2 | Product of Run 1 (Recycled) | 1 | 65 | 3 | 67 |
| 3 | Product of Run 2 (Recycled) | 1 | 65 | 3 | 76 |
| 4 | Product of Run 3 (Recycled) | 1 | 65 | 3 | 83 |
| 5 | Dodecylbenzyl chloride | 1 | 65 | 5 | 39 |
| 6 | Product of Run 5 (Recycled) | 1 | 65 | 5 | 65 |
| 7 | Product of Run 6 (Recycled) | 1 | 65 | 5 | 78 |
| 8 | Dodecylbenzyl chloride | 2 | 75 | 3 | |
| 9 | Product of Run 8 (Recycled) | 2 | 75 | 3 | 80 |

EXAMPLE V 229 grams of branched chain dodecyl toluene were treated for 3 hours at 55° C. with 1 unit of chloromethylating agent as defined in Example III. The product was isolated and then, by recycling, again subjected to chloromethylation treatment with 1 unit of the chloromethylating agent. The product of the chloromethylation was isolated and contained about 78 mole percent bis(chloromethyl)dodecyl toluene.

EXAMPLE VI 227 grams of dodecyl toluene were subjected to two consecutive chloromethylation treatment, each involving 1.5 units of chloromethylation mass as hereinbefore defined, and a total reaction time of 3 hours at 65° C. The product contained approximately 82 mole percent of the bis derivative.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A process for preparing polychloromethylated alkaryl hydrocarbons comprising reacting for a period of time of from about 4 to about 6 hours and at a temperature of from about 65° C. to about 70° C., 1 mole of an alkaryl hydrocarbon with from about 2.6 to about 6.0 moles of sulfuric acid and from about 2.1 to about 4.0 moles of a methyl halomethyl ether in which the halogen atoms are selected from the group consisting of chlorine and bromine, said process being characterized further in that said alkaryl hydrocarbon is selected from the group consisting of compounds having the structural formulae

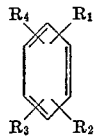

and

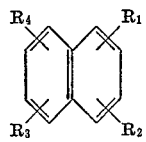

where $R_1$ is a normal or branched chain alkyl radical containing from about 8 to about 22 carbon atoms, and $R_2$, $R_3$ and $R_4$ are either hydrogen, methyl or ethyl.

2. A process as defined in claim 1 and further characterized to include the step of subjecting the product of said reaction to at least one subsequent further polychloromethylation reaction in which substantially the same temperature and time ranges specified in claim 1 are employed and said product is reacted with the same number of moles of sulfuric acid and ether as specified in claim 1.

3. A process as defined in claim 1 wherein the temperature at which said reaction is carried out is from about 66° C., to about 68° C.

4. A process as defined in claim 1 wherein from about 4.0 to about 5.0 moles of sulfuric acid is used and from about 3.4 to about 3.6 moles of ether is used in the reaction.

5. A process as defined in claim 4 wherein said methyl halomethyl ether is prepared by reacting at a temperature within the range of from about —20° C. to about 60° C.

(a) a compound selected from the class consisting of formaldehyde and compounds which engender formaldehyde wherein the amount of said compound is equivalent to 2.1 to 4.0 moles of formaldehyde, (b) 2.1 to 4.0 moles of a primary alkanol containing from 1 to 4 carbon atoms, and (c) 1.0 to 3.0 moles of a chlorine or bromine containing compound selected from the class consisting of phosphorous trichloride, phosphorous tribromide, phosphorous pentachloride, phosphorous pentabromide, sulfuric oxychloride, sulfurous oxychloride and acyl chlorides.

6. A process as defined in claim 5 wherein said halogen containing compound is phosphorous trichloride.

7. A process of preparing polychloromethylated alkyl benzenes which comprises reacting for a period of time of from about 4 to about 6 hours and at a temperature of from about 66° C. to about 68° C., 1 mole of an alkyl benzene, having at least one alkyl group containing from about 8 to about 22 carbon atoms with from about 4.0 to about 5.0 moles of sulfuric acid and a reagent prepared by reacting at a temperature within the range of from about —20° C. to about 60° C.

(a) a compound selected from the class consisting of formaldehyde and compounds which engender formaldehyde wherein the amount of said compound is equivalent to 3.4 to 3.6 moles of formaldehyde, (b) 3.1 to 3.3 moles of a primary alkanol containing from 1 to 4 carbon atoms, and (c) 1.1 to 1.3 moles of a chlorine-containing compound selected from the class consisting of phosphorous trichloride, phosphorous pentachloride, sulfuric oxychloride, sulfurous oxychloride, and acyl chlorides.

8. A process as defined in claim 7 wherein the chlorine-containing compound used in preparing said reagent is phosphorous trichloride.

9. A process as defined in claim 7 wherein the alkyl benzene employed is dodecylbenzene in which the dodecyl alkyl substituent is branched in character.

References Cited

UNITED STATES PATENTS 2,846,480   8/1958   McClaflin et al. _____ 260—651
3,288,555  11/1966  Napier et al. _____ 260—651 XR

OTHER REFERENCES

Chopey: "Chemical Engineering," vol. 69 (1962), pp. 150–52.

LEON ZITVER, *Primary Examiner.*

H. T. MARS, *Assistant Examiner.*